United States Patent
Xu et al.

(10) Patent No.: US 9,200,963 B2
(45) Date of Patent: Dec. 1, 2015

(54) METHOD AND APPARATUS FOR ALIGNING THE MEASUREMENTS OF COLOR MEASUREMENT INSTRUMENTS

(75) Inventors: Zhiling Xu, West Windsor, NJ (US); Michael H. Brill, Kingston, NJ (US)

(73) Assignee: Datacolor Holding AG, Luzern (CH)

( * ) Notice: Subject to any disclaimer, the term of this patent is extended or adjusted under 35 U.S.C. 154(b) by 656 days.

(21) Appl. No.: 13/585,346

(22) Filed: Aug. 14, 2012

(65) Prior Publication Data
US 2014/0019079 A1    Jan. 16, 2014

Related U.S. Application Data

(60) Provisional application No. 61/670,353, filed on Jul. 11, 2012.

(51) Int. Cl.
    *G01J 3/52*      (2006.01)
(52) U.S. Cl.
    CPC .................................. *G01J 3/524* (2013.01)
(58) Field of Classification Search
    CPC .......... G01B 11/27; G01J 3/027; G01J 3/513; G01J 3/524
    USPC ........................................................ 702/104
    See application file for complete search history.

(56) References Cited

U.S. PATENT DOCUMENTS

| | | | |
|---|---|---|---|
| 6,559,944 B1 | 5/2003 | Van Aken et al. | |
| 7,499,164 B2 | 3/2009 | Pawlanta | |
| 7,813,891 B2 * | 10/2010 | Bonino | .................. G01B 11/27 250/208.1 |
| 2004/0135794 A1 | 7/2004 | Van Aken et al. | |
| 2007/0002324 A1 | 1/2007 | Pawlanta et al. | |
| 2008/0013828 A1 | 1/2008 | Pearson et al. | |
| 2009/0097736 A1 | 4/2009 | Agarwal | |

OTHER PUBLICATIONS

International Search Report and Written Opinion for International Patent Application Serial No. PCT/US2013/049857, mailed Dec. 5, 2013, consists of 8 unnumbered pages.
Berns et al., "Empirical Modeling of Systematic Spectrophotometric Errors" Color Res Appl. vol. 13, No. 4, Aug. 1988. pp. 243-256.
Rich et al., "Improved Model for Improving the Inter-Instrument Agreement of Spectrophotometers" Analytica Chimica Acta 380 (1999) pp. 263-276.

(Continued)

*Primary Examiner* — Toan Le
*Assistant Examiner* — Manuel Rivera Vargas

(57) ABSTRACT

One embodiment of a method for aligning measurements taken by a plurality of color measurement instruments with measurements taken by an industry standard color measurement instrument includes receiving a first set of spectral data from the plurality of instruments, receiving a second set of spectral data from the industry standard instrument, generating initial profiles for the plurality of instruments (by producing, for each given instrument, a first correction that aligns the spectral data taken by the given instrument with the second set of spectral data), mathematically correcting the first set of spectral data using the initial profiles to produce a third set of spectral data, and generating new profiles for the plurality of instruments (by calculating a mean of the third set of spectral data, and producing, for each given instrument, a second correction that aligns the spectral data taken by the given instrument with the mean.

20 Claims, 7 Drawing Sheets

(56) References Cited

OTHER PUBLICATIONS

Ingleson et al., "Methods of Selecting a Small Reflectance Set as a Transfer Standard for Correcting Spectrophotometers" Color Res Appl. vol. 31, No. 1, Feb. 2006., pp. 13-17.

Notification Concerning Transmittal of International Preliminary Report on Patentability for International Patent Application Serial No. PCT/US2013/049857, mailed Jan. 22, 2015, consists of 6 pages.

* cited by examiner

METHOD AND APPARATUS FOR ALIGNING THE MEASUREMENTS OF COLOR MEASUREMENT INSTRUMENTS

CROSS REFERENCE TO RELATED APPLICATIONS

This application claims the benefit of U.S. Provisional Patent Application Ser. No. 61/670,353, filed Jul. 11, 2012, which is herein incorporated by reference in its entirety.

FIELD OF THE INVENTION

The present invention generally relates to the measurement of color, and more specifically relates to the coordination of multiple color measurement devices.

BACKGROUND

Color-measurement instruments (e.g., spectrophotometers) can be characterized parametrically and corrected to measure like a reference or master instrument. The characterization and correction is based on instrument profiles. The "profile" of a first instrument relative to a second instrument is defined herein as a set of parameter values that mathematically map a first set of reflectance values of a set of specimens as measured by the first instrument to the best approximation of a second set of reflectance values of the same specimens as measured by the second instrument. The act of "profiling" is defined herein as the generation of these parameter values, and "profile-based correction" is defined herein as the act of implementing the mapping defined by these parameter values to correct subsequent reflectance measurements by the profiled instrument. Such profile-based correction compensates for small systematic differences between instruments. Profile-based correction typically starts from a model equation such as the following:

$$R_{ci} = A + BR_{mi} + CR'_{mi}DR''_{mi-} + ER_{mi}(100-R_{mi}) \quad (EQN. 1)$$

Where $R_{mi}$ is the $i^{th}$ measured reflectance, $R_{ci}$ is the $i^{th}$ corrected reflectance, all variables A, B, C, D, and E implicitly depend on wavelength, and ' and " refer to the first and second derivatives, respectively, of $R_{mi}$ with respect to wavelength. The corrections in EQN. 1 are represented by the following parameters: offset (A), gain change (B), wavelength-scale change (C), bandwidth change (D), and some nonlinearities (E). EQN. 1 (or a similar equation, possibly with a different number of parameters) is used twice in profile-based correction. The first usage of EQN. 1 measures known specimens such as the British Ceramic Research Association (BCRA) tiles with parameters A-E (at each wavelength) in the solve state. In this first usage of EQN. 1, optimizing software is typically used to find the parameter values A-E that make the computed quantities $R_{ci}$ closest to the quantities $R_{mi}$ of the second instrument. The now-known quantities A-E (and possibly other parameters) comprise the profile of the first instrument relative to the second instrument. During the second usage of EQN. 1, the first instrument measures reflectances of test specimens, adopts the measured reflectances of the test specimens as the quantities $R_{mi}$, substitutes the now-known parameters A-E into EQN. 1, and uses EQN. 1 to compute the corrected measurements Rd. Continued operation of the second usage of EQN. 1 constitutes the profile-based correction of the reflectance measurements.

Profile-based correction of a fleet of spectrophotometers depends on the availability of a master instrument (to act as the second instrument described above) and at least one set of trustworthy color standards (i.e., reflecting specimens such as the BCRA tiles). Such correction also works best when the master instrument is very close in design to the instruments that are being corrected to it in the fleet. In some cases, the trusted master instrument may have a slightly different design than the instruments in the fleet; however, the master instrument must still be used as an initial anchor if no better standard exists. In such a case, one can improve the inter-instrument agreement by computing the average reflectance data from the fleet of instruments and correcting the fleet of instruments to this average. However, this introduces another problem: the use of the average reflectance data requires use of the same reflecting color standards for all of the profiling measurements. This is impractical, especially when the instruments in the fleet are not geographically co-located. One must have at hand either a real master instrument or a real set of standard color tiles that is used for all corrections.

SUMMARY OF THE INVENTION

In one embodiment, the present invention includes a software program for aligning the measurements of a fleet of color measurement instruments with a master (or "industry standard") color measurement instrument outside of the fleet. The software program includes four main sub-processes: (1) a process for generating initial profiles for the color measurement instruments in the fleet using an initial set of color tiles; (2) a process for generating new profiles for the color measurement instruments in the fleet based on the initial set of color tiles; (3) a process for generating a profile for a new device that is "similar" to the color measurement instruments in the fleet; and (4) a process for generating new profiles for the fleet of color measurement instruments based on a new set of color tiles.

One embodiment of a method for aligning measurements taken by a plurality of color measurement instruments with measurements taken by an industry standard color measurement instrument includes receiving a first set of spectral data from the plurality of instruments, receiving a second set of spectral data from the industry standard instrument, generating initial profiles for the plurality of instruments (by producing, for each given instrument, a first correction that aligns the spectral data taken by the given instrument with the second set of spectral data), mathematically correcting the first set of spectral data using the initial profiles to produce a third set of spectral data, and generating new profiles for the plurality of instruments (by calculating a mean of the third set of spectral data, and producing, for each given instrument, a second correction that aligns the spectral data taken by the given instrument with the mean.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
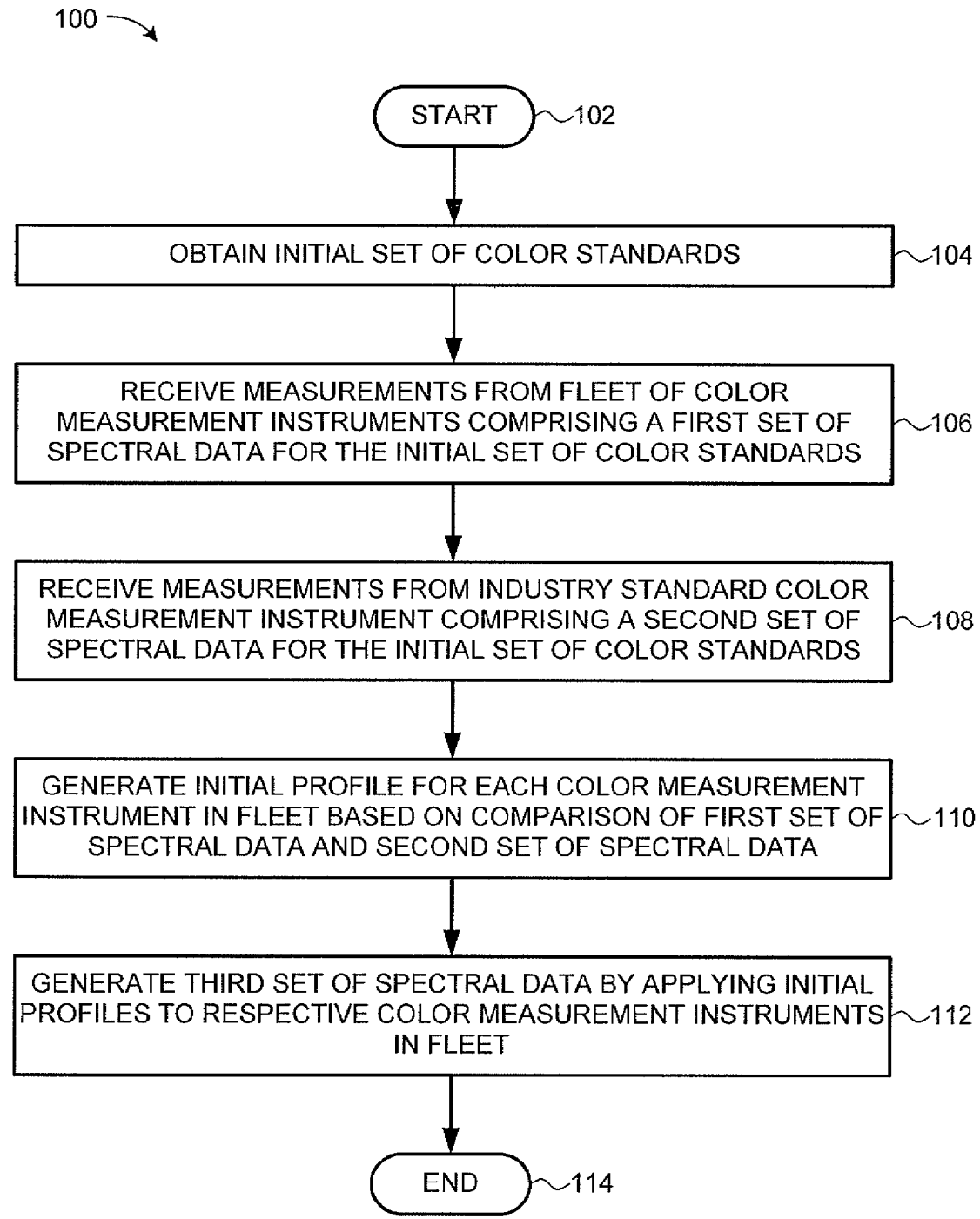
FIG. 1 is a flow diagram illustrating one embodiment of a method for generating initial profiles for the color measurement instruments in a fleet of color measurement instruments, according to the present invention.

In one embodiment, the present invention includes a method and apparatus for aligning the measurements of a fleet of color measurement instruments to a master (or "industry standard") color measurement instrument outside of the fleet. The method includes four main sub-processes: (1) a process for generating initial profiles for the color measurement instruments in the fleet using an initial set of color tiles; (2) a process for generating new profiles for the color measurement instruments in the fleet based on the initial set of color tiles; (3) a process for generating a profile for a new device that is similar to (i.e., has the same specimen-illumination pattern and specimen-viewing geometry as) the color measurement instruments in the fleet; and (4) a process for generating new profiles for a new group of similar color measurement instruments based on a new set of color tiles.

In one embodiment, sub-processes (2)-(4) are considered optional and may be performed in any combination and/or order once sub-process (1) is performed. However, a given color measurement instrument must be subjected to either sub-process (2) (if the color measurement instrument is a member of the fleet) or sub-process (3) (if the color measurement instrument is not a member of the fleet) if the color measurement instrument is to be able to measure color accurately. Moreover, if the initial set of color tiles is unavailable, a new color measurement device (not a member of the fleet) must be subjected to sub-process (4) in order to be able to measure color accurately.

In practice, a certain type of color measurement instrument developed by a certain manufacturer may have systematic differences compared to some commonly used industry standard instrument. Furthermore, systematic differences may exist among instruments in a fleet of similar color measurement instruments, and thus the inter-instrument agreement among the fleet may be poor.

For example, Table 1 shows the Commission internationale de l'eclairage (CIE) 1976 ($L^*$, $a^*$, $b^*$) color space (CIELAB) color difference $\Delta E$ (under illuminant D65) when using different instruments to measure the same set of color standards (in this case, reflecting tiles C1, . . . , C12). For each color standard, the color difference is calculated between the measured color from one instrument and the average of the same measured color (reflectance data) from all the instruments. As illustrated, $\Delta E$ ranges from 0.01 to 0.75.

TABLE 1

| | Color difference between original instruments and the averages | | | | | | | |
|---|---|---|---|---|---|---|---|---|
| | Instr. 1 | Instr. 2 | Instr. 3 | Instr. 4 | Instr. 5 | Instr. 6 | Instr. 7 | Instr. 8 |
| C1 | 0.0921 | 0.0436 | 0.0707 | 0.0323 | 0.0311 | 0.023 | 0.0274 | 0.0206 |
| C2 | 0.0987 | 0.0722 | 0.1186 | 0.0425 | 0.0101 | 0.0485 | 0.0546 | 0.068 |
| C3 | 0.0882 | 0.0163 | 0.0911 | 0.0506 | 0.0169 | 0.0445 | 0.0577 | 0.071 |
| C4 | 0.0713 | 0.0428 | 0.062 | 0.0316 | 0.0489 | 0.0575 | 0.0425 | 0.074 |
| C5 | 0.1484 | 0.0366 | 0.1047 | 0.1039 | 0.1013 | 0.0398 | 0.0902 | 0.05 |
| C6 | 0.1024 | 0.1899 | 0.0662 | 0.2101 | 0.1229 | 0.0947 | 0.4041 | 0.0611 |
| C7 | 0.0826 | 0.3198 | 0.2026 | 0.4211 | 0.0698 | 0.2524 | 0.6465 | 0.1131 |
| C8 | 0.1474 | 0.4072 | 0.3702 | 0.3745 | 0.1437 | 0.3263 | 0.7542 | 0.0983 |
| C9 | 0.0825 | 0.2928 | 0.171 | 0.2946 | 0.2225 | 0.1322 | 0.4587 | 0.1299 |
| C10 | 0.1545 | 0.1739 | 0.0996 | 0.2364 | 0.1109 | 0.2094 | 0.3914 | 0.1277 |
| C11 | 0.1653 | 0.1499 | 0.0811 | 0.247 | 0.1095 | 0.239 | 0.5375 | 0.1012 |
| C12 | 0.1221 | 0.0987 | 0.1185 | 0.212 | 0.1415 | 0.0549 | 0.2326 | 0.0509 |

To reduce the systematic differences between a fleet of color measurement instruments and a widely accepted industry standard, and to improve the inter-instrument agreement performance among the fleet of color measurement instruments, the industry standard instrument can be used to measure the same set of color standards, to generate a profile for a given instrument in the fleet based on the difference between the given instrument and the industry standard, and to apply the profile to the given instrument. After each instrument in the fleet is profiled in this way, subsequent measurements by each instrument are corrected (or correlated) by using the respective profile. Compared to the uncorrected instruments (i.e., the instruments prior to application of the respective profiles), the corrected instruments perform more like the industry standard, and the inter-instrument agreement among the instruments in the fleet will be much tighter.

FIG. 1 is a flow diagram illustrating one embodiment of a method 100 for generating initial profiles for the color measurement instruments in a fleet of color measurement instruments, according to the present invention. Thus, the method 100 corresponds to sub-process (1) discussed above. The method 100 may be performed, for example, by a centralized processor that communicates with the fleet of color measurement instruments.

The method 100 begins in step 102. In step 104, an initial set of color standards (e.g., color tiles) is obtained. In step 106, measurements are received from each instrument in the fleet of color measurement instruments. The measurements received in step 106 comprise a first set of spectral data measured from the initial set of color standards.

In step 108, measurements are received from an industry standard color measurement instrument, which is not a member of the fleet of color measurement instruments. The measurements received in step 108 comprise a second set of spectral data measured from the initial set of color standards.

In step 110, an initial profile is generated for each color measurement instrument in the fleet of color measurement instruments. A given color measurement instrument's initial profile is based on a comparison of the portion of the first set of spectral data that is received from the given color measurement instrument to the second set of spectral data (e.g., via an equation such as EQN. 1).

In step 112, a third set of spectral data is generated by applying the initial profiles to the respective color measurement instruments in the fleet. Application of the initial profiles in accordance with step 112 involves using the initial profile for a given color measurement instrument to mathematically correct the portion of the first set of spectral data that was measured by the given color measurement instrument. When the initial profiles have been applied in this way to each of the respective color measurement instruments in the fleet (i.e., such that all portions of the first set of spectral data have been mathematically corrected accordingly), the third set of spectral data is produced. The method 100 then ends in step 114.

The method 100 thus produces a "corrected" fleet of color measurement instruments. In other words, the initial profiles correct the measurements of the color measurement instruments in the fleet so that they are closer to what the industry standard color measurement instrument would have measured. Table 2 shows the CIELAB color difference when using different instruments in the corrected fleet to measure the same set of color standards. As illustrated, $\Delta E$ ranges from 0.01 to 0.2, which is much tighter when compared to the ranges in Table 1 for an "uncorrected" fleet.

TABLE 2

Color differences between industry-standard-corrected instruments and the virtual center

| | Instr. 1 | Instr. 2 | Instr. 3 | Instr. 4 | Instr. 5 | Instr. 6 | Instr. 7 | Instr. 8 |
|---|---|---|---|---|---|---|---|---|
| C1 | 0.054 | 0.0604 | 0.0914 | 0.1045 | 0.0988 | 0.1221 | 0.0213 | 0.0911 |
| C2 | 0.0668 | 0.0828 | 0.1876 | 0.0834 | 0.0888 | 0.0584 | 0.0764 | 0.0567 |
| C3 | 0.0624 | 0.0724 | 0.0966 | 0.0586 | 0.0098 | 0.0707 | 0.0448 | 0.0204 |
| C4 | 0.0968 | 0.0365 | 0.0425 | 0.0345 | 0.022 | 0.0514 | 0.0853 | 0.0922 |
| C5 | 0.1451 | 0.1828 | 0.107 | 0.0477 | 0.1726 | 0.1181 | 0.1538 | 0.1042 |
| C6 | 0.0202 | 0.0808 | 0.0748 | 0.0141 | 0.0203 | 0.0792 | 0.0415 | 0.121 |
| C7 | 0.2021 | 0.0565 | 0.1646 | 0.0977 | 0.0408 | 0.0597 | 0.0667 | 0.0867 |
| C8 | 0.1425 | 0.0839 | 0.1792 | 0.0402 | 0.0619 | 0.0819 | 0.0775 | 0.0996 |
| C9 | 0.0719 | 0.0706 | 0.0212 | 0.0609 | 0.1342 | 0.0517 | 0.0448 | 0.0864 |
| C10 | 0.0374 | 0.0506 | 0.0709 | 0.0622 | 0.1011 | 0.1175 | 0.0108 | 0.0404 |
| C11 | 0.0556 | 0.057 | 0.0563 | 0.052 | 0.0943 | 0.1033 | 0.0196 | 0.0592 |
| C12 | 0.1578 | 0.1608 | 0.1706 | 0.0582 | 0.0859 | 0.0592 | 0.0587 | 0.0804 |

Figure 2:
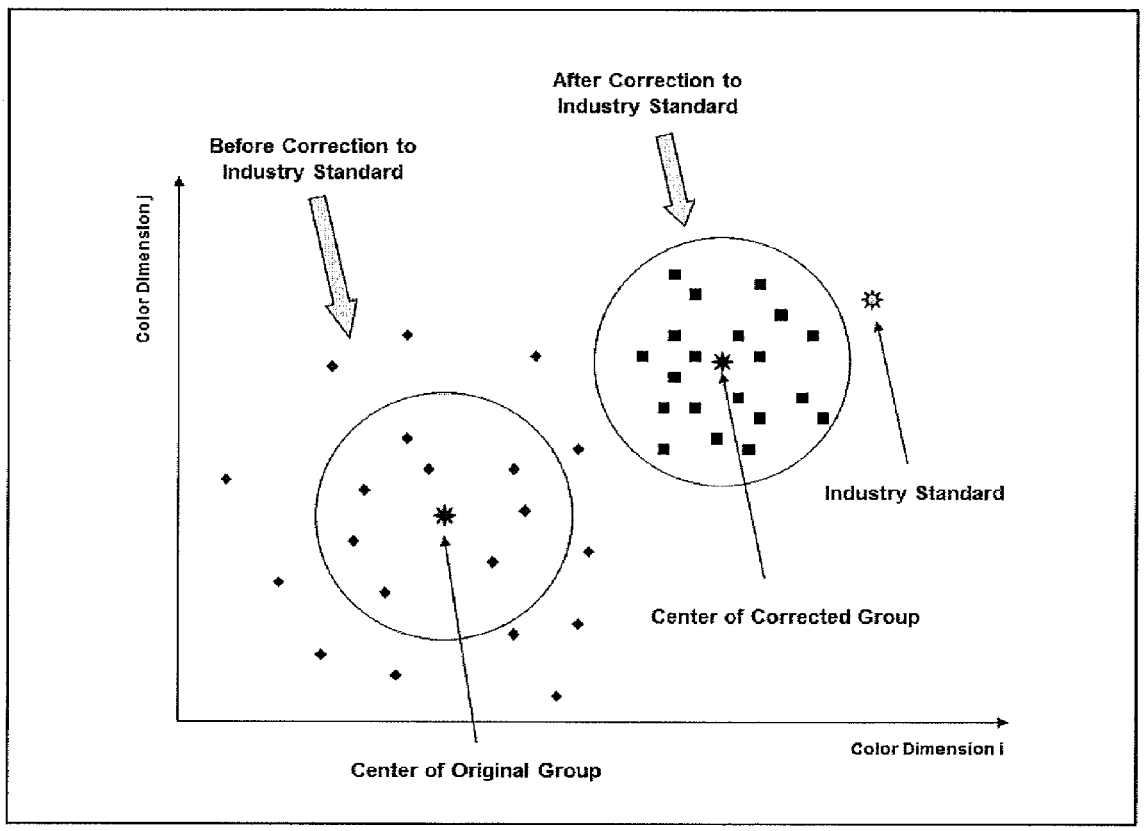
FIG. 2 is a diagram further illustrating the improvement on color measurement performance according to the method illustrated in FIG. 1.

FIG. 2 is a diagram further illustrating the improvement on color measurement performance according to the method 100 illustrated in FIG. 1. For ease of illustration, the multi-dimensional color space (three dimensions of color×twelve color tiles) is represented as a plane.

As can be seen in FIG. 2, after being corrected to the industry standard, not only do the individual color measurement instruments in the corrected fleet exhibit smaller differences from the industry standard color measurement instrument, but the color measurement instruments in the fleet also exhibit smaller differences among themselves (i.e., inter-instrument agreement among the fleet is improved). After being corrected to the industry standard color measurement instrument, the fleet of color measurement instruments as a whole shifts closer to the industry standard color measurement instrument, and the clustering is much tighter than that of the original, uncorrected fleet.

Once a large enough population is obtained in the corrected fleet, the center of the fleet will be stable. Any color measurement instrument that is either part of the original fleet or is not part of the original fleet but is similar to the color measurement instruments in the original fleet (such as any color measurement instrument coming from the production line of the original fleet) can then be corrected to the virtual center of the corrected fleet.

Figure 3:
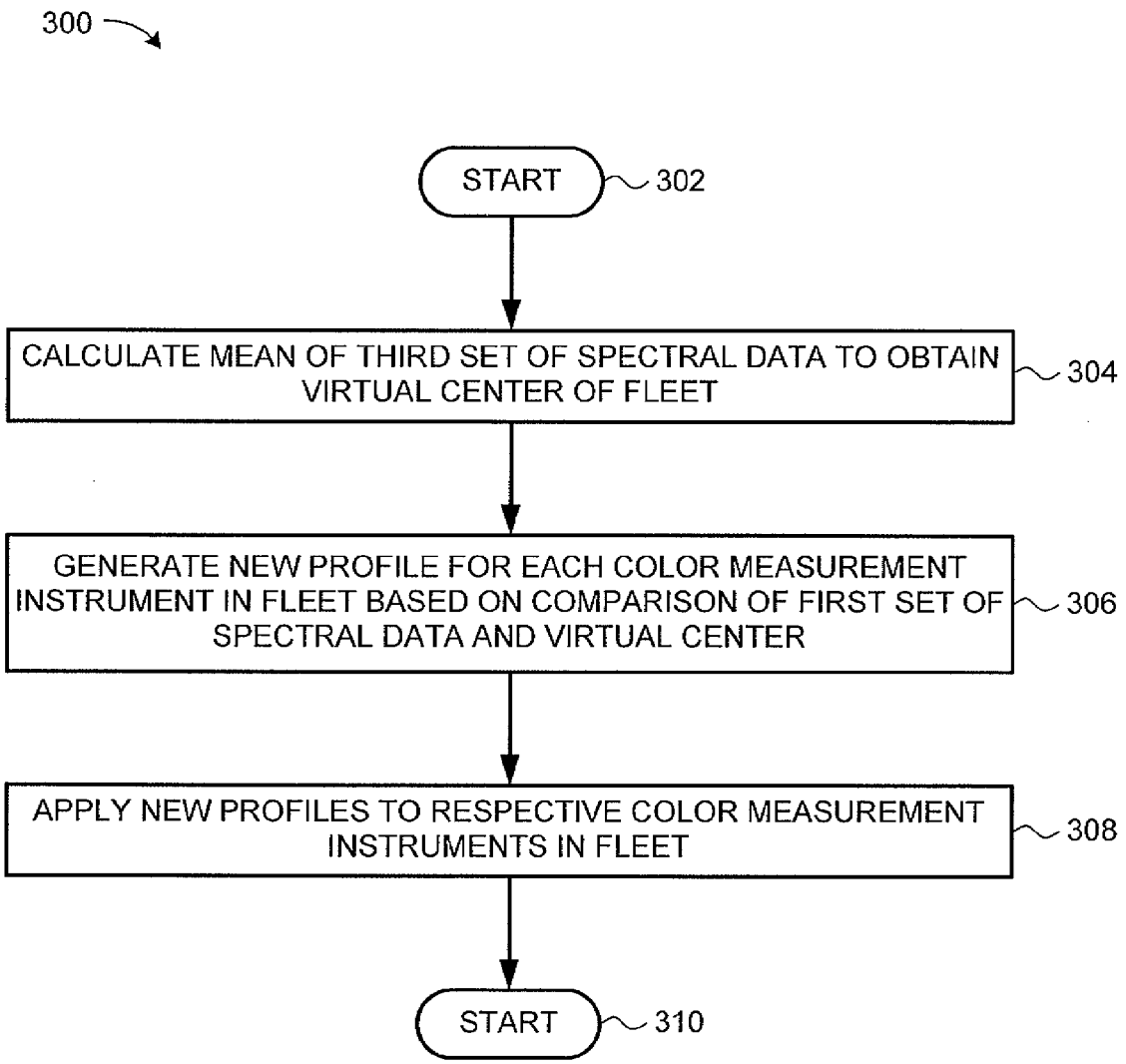
FIG. 3 is a flow diagram illustrating one embodiment of a method for generating new profiles for the color measurement instruments in the fleet based on the initial set of color standards, according to the present invention.

FIG. 3 is a flow diagram illustrating one embodiment of a method 300 for generating new profiles for the color measurement instruments in the fleet based on the initial set of color standards, according to the present invention. Thus, the method 300 corresponds to sub-process (2) discussed above. Like the method 100, the method 300 may be performed, for example, by a centralized processor that communicates with the fleet of color measurement instruments.

The method 300 begins in step 302. In step 304, the mean of the third set of spectral data (i.e., the measurements taken by the fleet of color measurement instruments that are mathematically corrected using the initial profiles) is calculated. As used herein, the term "mean" refers to the mean of a set of measurements taken by the fleet of color measurement instruments, rather than the mean of a set of measurements taken by a single color measurement instrument. The mean of the third set of spectral data represents the "virtual center" for the fleet of color measurement instruments.

In step 306, a new profile is generated for each color measurement instrument in the fleet. A given color measurement instrument's new profile is based on a comparison of the portion of the first set of spectral data that is received from the given color measurement instrument (i.e., the spectral data measured by the given color measurement instrument before application of the initial profile) to the virtual center (e.g., via an equation such as EQN. 1).

In step 308, the new profiles are applied to the respective color measurement instruments in the fleet. Application of the new profiles in accordance with step 308 involves using the new profile for a given color measurement instrument to mathematically correct subsequent measurements of spectral data by the given color measurement instrument. The method 300 then ends in step 310.

The method 300 thus refines the initial profiles generated for the fleet of color measurement instruments using the initial set of color tiles. After application of the new profiles, the inter-instrument agreement of the fleet of color measurement instruments is further improved, without using the industry standard color measurement instrument.

To illustrate, Table 3 shows the CIELAB color difference when the original fleet of color measurement instruments is corrected to the virtual center directly, without using the industry standard color measurement instrument. The color difference is measured between the corrected color measurement instrument and the virtual center. As illustrated, most ΔE are below 0.1, with only a few exceptions going up to 0.19.

TABLE 3

Color difference between the virtual center and the instruments that are directly corrected to the virtual center

|     | Instr. 1 | Instr. 2 | Instr. 3 | Instr. 4 | Instr. 5 | Instr. 6 | Instr. 7 | Instr. 8 |
|-----|----------|----------|----------|----------|----------|----------|----------|----------|
| C1  | 0.004    | 0.0072   | 0.0219   | 0.0083   | 0.0059   | 0.0036   | 0.0043   | 0.0122   |
| C2  | 0.0238   | 0.0505   | 0.0975   | 0.0311   | 0.0599   | 0.0516   | 0.0513   | 0.033    |
| C3  | 0.0263   | 0.0517   | 0.0714   | 0.0486   | 0.0415   | 0.0285   | 0.0448   | 0.0441   |
| C4  | 0.0649   | 0.0466   | 0.045    | 0.023    | 0.0116   | 0.0028   | 0.0558   | 0.0408   |
| C5  | 0.011    | 0.0112   | 0.0193   | 0.0205   | 0.016    | 0.0146   | 0.0162   | 0.0148   |
| C6  | 0.0482   | 0.0355   | 0.036    | 0.05     | 0.015    | 0.0317   | 0.0325   | 0.0609   |
| C7  | 0.0426   | 0.0366   | 0.058    | 0.0569   | 0.0366   | 0.0519   | 0.0609   | 0.0085   |
| C8  | 0.0171   | 0.059    | 0.1863   | 0.0446   | 0.0305   | 0.0283   | 0.0446   | 0.0324   |
| C9  | 0.0227   | 0.0506   | 0.1323   | 0.0454   | 0.0322   | 0.0188   | 0.0508   | 0.0825   |
| C10 | 0.0351   | 0.0222   | 0.0707   | 0.069    | 0.0338   | 0.0729   | 0.0448   | 0.0329   |
| C11 | 0.0141   | 0.048    | 0.0577   | 0.0497   | 0.035    | 0.011    | 0.0114   | 0.0371   |
| C12 | 0.0294   | 0.0195   | 0.092    | 0.0259   | 0.0763   | 0.0485   | 0.0573   | 0.0262   |

Figure 4:
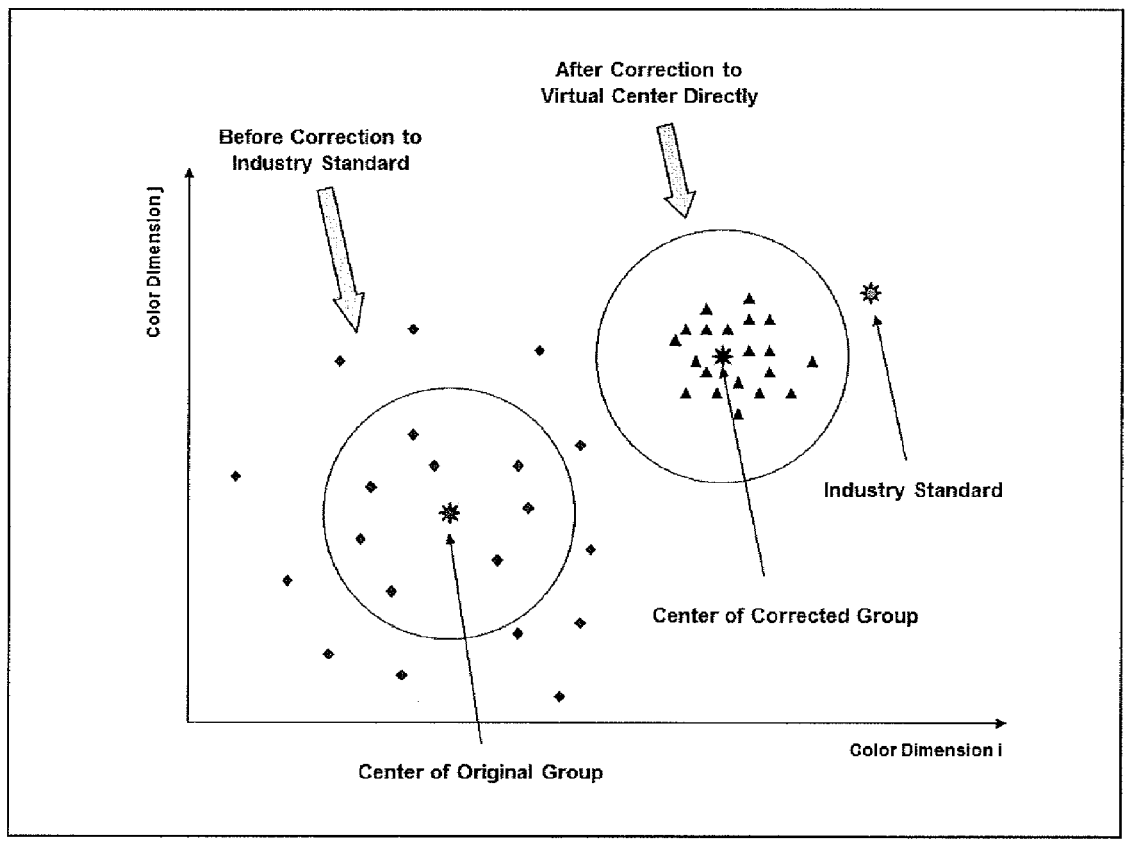
FIG. 4 is a diagram further illustrating the improvement of color measurement performances by application of the method illustrated in FIG. 3 to correct a fleet of instruments to the pre-determined virtual center.

FIG. 4 is a diagram further illustrating the improvement of color measurement performances by application of the method 300 illustrated in FIG. 3 to correct a fleet of instruments to the pre-determined virtual center. For ease of illustration, the multi-dimensional color space (three dimensions of color×twelve color tiles) is represented as a plane.

As can be seen in FIG. 4, after being corrected to the virtual center directly, not only do the individual color measurement instruments in the corrected fleet exhibit smaller differences from the industry standard color measurement instrument, but the color measurement instruments in the fleet also exhibit smaller differences among themselves (i.e., inter-instrument agreement among the fleet is improved. After being corrected to the virtual center, the fleet of color measurement instruments as a whole shifts closer to the industry standard color measurement instrument, and the clustering is much tighter than that of the original, uncorrected fleet. Moreover, the clustering is tighter even than that of the fleet that has been corrected using the initial profiles (as illustrated in FIG. 2).

Figure 5:
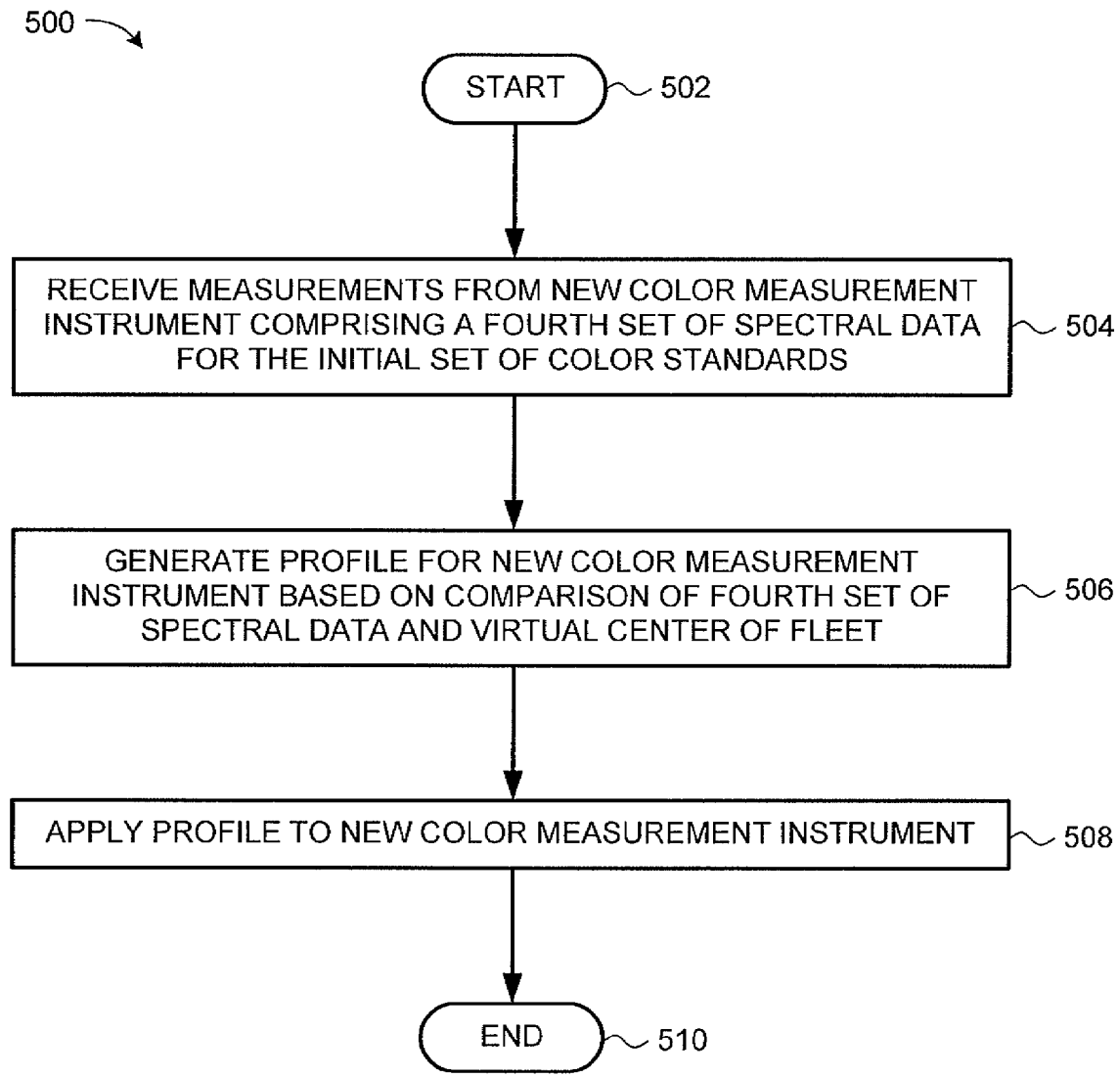
FIG. 5 is a flow diagram illustrating one embodiment of a method for generating a profile for a new color measurement instrument.

FIG. 5 is a flow diagram illustrating one embodiment of a method 500 for generating a profile for a new color measurement instrument. The new color measurement instrument is a color measurement instrument that is not part of the original fleet but is similar to the color measurement instruments in the original fleet (such as any color measurement instrument coming from the production line of the original fleet) Thus, the method 500 corresponds to sub-process (3) discussed above. The method 500 may be performed, for example, by a centralized processor that communicates with the fleet of color measurement instruments.

The method 500 begins in step 502. In step 504, measurements from the new color measurement instrument are received. The measurements received in step 504 comprise a fourth set of spectral data measured from the initial set of color standards.

In step 506, a profile is generated for the new color measurement instrument. The new color measurement instrument's profile is based on a comparison of the fourth set of spectral data to the virtual center of the fleet of color measurement instruments.

In step 508, the profile is applied to the new color measurement instrument. Application of the profile in accordance with step 508 involves using the profile to mathematically correct subsequent measurements of spectral data by the new color measurement instrument. The method 500 then ends in step 510.

Thus, the method 500 creates a profile for a new color measurement instrument that is similar to the instruments in the fleet of color measurement instruments, using the virtual center and the initial set of color standards.

At some point, it may be necessary to utilize a new set of color standards (e.g., due to unavailability of the initial set of color standards). In this case, the previously calculated virtual center of the fleet is no longer useful, since it is associated with the initial set of color standards. Thus, for similar instruments that are in current need of profiling (whether or not the similar instruments come from the original fleet) it will be necessary to generate new profiles using the new set of color standards.

Figure 6:
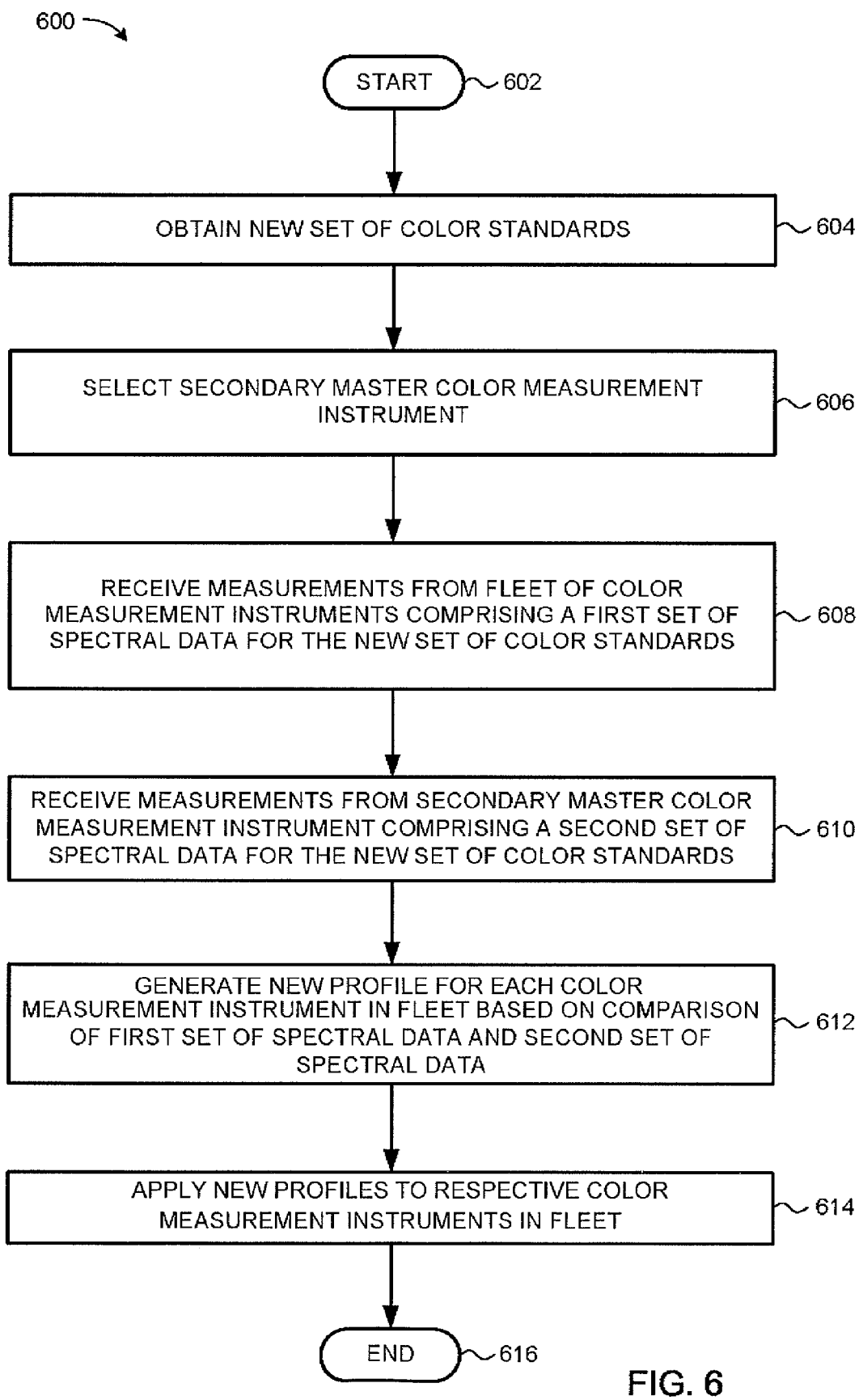
FIG. 6 is a flow diagram illustrating one embodiment of a method 600 for generating new profiles for the fleet of color measurement instruments based on a new set of color standards, according to the present invention.

FIG. 6 is a flow diagram illustrating one embodiment of a method 600 for generating new profiles for the fleet of color measurement instruments based on a new set of color standards, according to the present invention. Thus, the method 600 correlates to sub-process (4) discussed above. The method 600 may be performed, for example, by a centralized processor that communicates with the fleet of color measurement instruments.

The method 600 begins in step 602. In step 604, a new set of color standards (e.g., color tiles) is obtained.

In step 606, a secondary "master" color measurement instrument is selected either from the fleet of color measurement instruments or from a larger set of optically similar instruments. In one embodiment, the secondary master color measurement instrument is a color measurement instrument in this set whose measurements of the initial set of color standards are close to the virtual center.

In step 608, measurements are received from each instrument in the fleet of color measurement instruments. The measurements received in step 608 comprise a first set of spectral data measured from the new set of color standards.

In step 610, measurements are received from the secondary master color measurement instrument. The measurements received in step 610 comprise a second set of spectral data measured from the new set of color standards.

In step 612, a new profile is generated for each color measurement instrument in the fleet of color measurement instruments, relative to the new set of color standards. A given color measurement instrument's new profile is based on a comparison of the portion of the first set of spectral data that is received from the given color measurement instrument to the second set of spectral data (e.g., via an equation such as EQN. 1).

In step 614, the new profiles are applied to the respective color measurement instruments in the fleet. Application of the new profiles in accordance with step 614 involves using the new profile for a given color measurement instrument to mathematically correct the portion of the first set of spectral data that was measured by the given color measurement instrument. The method 100 then ends in step 616.

Thus, the method 600 is similar to the method 100, except that the method 600 uses the new set of color standards in place of the initial set of color standards and uses the secondary master color measurement instrument in place of the industry standard color measurement instrument. In the case of the method 600, the fleet is a set of color measurement instruments that are similar (but not necessarily identical) to the fleet of color measurement instruments deployed in accordance with the method 100. A new set of profiles is then generated for the fleet of color measurement instruments, based on the new set of color standards. The method 600 ends in step 610.

Thus, the secondary master instrument is used, along with the new color standards, to generate new profiles for a newly defined fleet of color measurement instruments according to the process described above in connection with FIG. 1.

Figure 7:
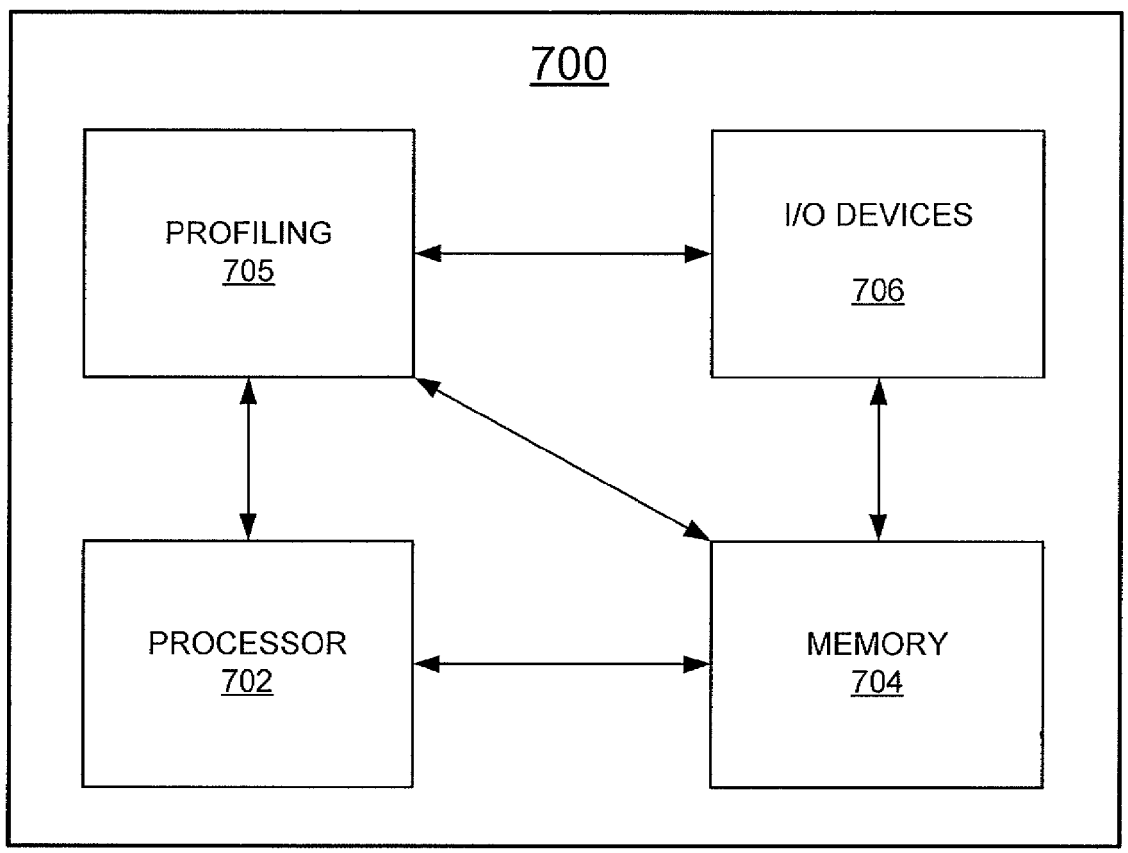
FIG. 7 is a high-level block diagram of the profiling method that is implemented using a general purpose computing device.

FIG. 7 is a high-level block diagram of the profiling method that is implemented using a general purpose computing device 700. In one embodiment, a general purpose computing device 700 comprises a processor 702, a memory 704, a profiling module 705 and various input/output (I/O) devices 706 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the profiling module 705 can be implemented as a physical device or subsystem that is coupled to a processor through a communication channel.

Alternatively, the profiling module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the profiling module 705 for aligning the measurements of a fleet of color measurement instruments to a master (or "industry standard") color measurement instrument outside of the fleet, as described herein with reference to the preceding figures, can be stored on a tangible or physical computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for aligning measurements taken by a fleet comprising a plurality of color measurement instruments with measurements taken by a master color measurement instrument that is outside of the fleet, the method comprising:
receiving a first set of spectral data from the plurality of color measurement instruments;
receiving a second set of spectral data from the master color measurement instrument;
generating a plurality of initial profiles for the plurality of color measurement instruments, wherein the generating the plurality of initial profiles comprises, for each given instrument in the plurality of color measurement instruments:
producing a first correction based on a comparison of a portion of the first set of spectral data that was taken by the given instrument to the second set of spectral data, wherein the first correction aligns the portion of the first set of spectral data that was taken by the given instrument with the second set of spectral data;
mathematically correcting the first set of spectral data using the plurality of initial profiles, wherein the correcting results in a third set of spectral data;
generating a plurality of new profiles for the plurality of color measurement instruments, using the third set of spectral data, wherein the generating the plurality of new profiles comprises:
calculating a mean of the third set of spectral data; and
producing, for each given instrument in the plurality of color measurement instruments, a second correction based on a comparison of the portion of the first set of spectral data that was taken by the given instrument to the mean, wherein the second correction aligns the portion of the first set of spectral data that was taken by the given instrument with the mean;
obtaining a preliminary reflectance measurement of a sample taken by one of the plurality of color measurement instruments; and
generating a corrected reflectance measurement using the preliminary reflectance measurement and the second correction corresponding to the one of the plurality of color measurement instruments.

2. The method of claim 1, further comprising:
mathematically correcting a fourth set of spectral data received from the plurality of color measurement instruments using the plurality of new profiles.

3. The method of claim 2, further comprising:
generating a profile for a new color measurement instrument outside of the fleet.

4. The method of claim 3, wherein the generating the profile for the new color measurement instrument comprises:
receiving a fourth set of spectral data from the new color measurement instrument; and
producing a third correction based on a comparison of the fourth set of spectral data to the mean, wherein the third correction aligns the fourth set of spectral data with the mean.

5. The method of claim 4, further comprising:
mathematically correcting a fifth set of spectral data received from the new color measurement instrument using the profile for the new color measurement instrument.

6. The method of claim 4, wherein the first set of spectral data, the second set of spectral data, and the fourth set of spectral data comprise measurements of a common set of color standards.

7. The method of claim 1, wherein the first set of spectral data and the second set of spectral data comprise measurements of an initial set of color standards.

8. The method of claim 7, further comprising:
obtaining a new set of color standards different from the initial set of color standards.

9. The method of claim 8, further comprising:
generating a plurality of new profiles for the plurality of color measurement instruments, using the new set of color standards.

10. The method of claim 8, wherein the generating the new plurality of profiles comprises:
selecting a secondary master color measurement instrument from the fleet;
receiving a third set of spectral data from the plurality of color measurement instruments, not including the secondary master color measurement instrument;
receiving a fourth set of spectral data from the secondary master color measurement instrument; and
generating the plurality of new profiles for the plurality of color measurement instruments, wherein the generating the plurality of new profiles comprises, for each given instrument in the plurality of color measurement instruments:
producing a second correction based on a comparison of a portion of the third set of spectral data that was taken by the given instrument to the fourth set of spectral data, wherein the second correction aligns the portion of the third set of spectral data that was taken by the given instrument with the fourth set of spectral data,
wherein the third set of spectral data and the fourth set of spectral data comprise measurements of the new set of color standards.

11. The method of claim 1, wherein at least one color measurement instrument of the plurality of color measurement instruments and the master color measurement instrument is a spectrophotometer.

12. A non-transitory computer readable storage medium containing an executable program for aligning measurements taken by a fleet comprising a plurality of color measurement instruments with measurements taken by a master color measurement instrument that is outside of the fleet, where the program performs steps comprising:
receiving a first set of spectral data from the plurality of color measurement instruments;
receiving a second set of spectral data from the master color measurement instrument;
generating a plurality of initial profiles for the plurality of color measurement instruments, wherein the generating the plurality of initial profiles comprises, for each given instrument in the plurality of color measurement instruments:
producing a first correction based on a comparison of a portion of the first set of spectral data that was taken by the given instrument to the second set of spectral data, wherein the first correction aligns the portion of the first set of spectral data that was taken by the given instrument with the second set of spectral data;
mathematically correcting the first set of spectral data using the plurality of initial profiles, wherein the correcting results in a third set of spectral data;
generating a plurality of new profiles for the plurality of color measurement instruments, using the third set of spectral data, wherein the generating the plurality of new profiles comprises:
calculating a mean of the third set of spectral data; and
producing, for each given instrument in the plurality of color measurement instruments, a second correction based on a comparison of the portion of the first set of spectral data that was taken by the given instrument to the mean, wherein the second correction aligns the portion of the first set of spectral data that was taken by the given instrument with the mean;
obtaining a preliminary reflectance measurement of a sample taken by one of the plurality of color measurement instruments; and
generating a corrected reflectance measurement using the preliminary reflectance measurement and the second correction corresponding to the one of the plurality of color measurement instruments.

13. The non-transitory computer readable storage medium of claim 12, further comprising:
mathematically correcting a fourth set of spectral data received from the plurality of color measurement instruments using the plurality of new profiles.

14. The non-transitory computer readable storage medium of claim 13, further comprising:
generating a profile for a new color measurement instrument outside of the fleet.

15. The non-transitory computer readable storage medium of claim 14, wherein the generating the profile for the new color measurement instrument comprises:
receiving a fourth set of spectral data from the new color measurement instrument; and
producing a third correction based on a comparison of the fourth set of spectral data to the mean, wherein the third correction aligns the fourth set of spectral data with the mean.

16. The non-transitory computer readable storage medium of claim 15, further comprising:
mathematically correcting a fifth set of spectral data received from the new color measurement instrument using the profile for the new color measurement instrument.

17. The non-transitory computer readable storage medium of claim 15, wherein the first set of spectral data, the second set of spectral data, and the fourth set of spectral data comprise measurements of an initial set of color standards.

18. The non-transitory computer readable storage medium of claim 17, further comprising:
obtaining a new set of color standards different from the initial set of color standards.

19. The non-transitory computer readable storage medium of claim 18, further comprising:
generating a plurality of new profiles for the plurality of color measurement instruments, using the new set of color standards, wherein the generating the new plurality of profiles comprises:
selecting a secondary master color measurement instrument from the fleet;
receiving a third set of spectral data from the plurality of color measurement instruments, not including the secondary master color measurement instrument;
receiving a fourth set of spectral data from the secondary master color measurement instrument; and
generating the plurality of new profiles for the plurality of color measurement instruments, wherein the generating the plurality of new profiles comprises, for each given instrument in the plurality of color measurement instruments:
    producing a second correction based on a comparison of a portion of the third set of spectral data that was taken by the given instrument to the fourth set of spectral data, wherein the second correction aligns the portion of the third set of spectral data that was taken by the given instrument with the fourth set of spectral data,
wherein the third set of spectral data and the fourth set of spectral data comprise measurements of the new set of color standards.

20. A system for aligning measurements taken by a fleet comprising a plurality of color measurement instruments with measurements taken by a master color measurement instrument that is outside of the fleet, the system comprising:
    a processor; and
    a computer readable medium containing an executable program that causes the processor to perform operations comprising:
        receiving a first set of spectral data from the plurality of color measurement instruments;
        receiving a second set of spectral data from the master color measurement instrument;
        generating a plurality of initial profiles for the plurality of color measurement instruments, wherein the generating the plurality of initial profiles comprises, for each given instrument in the plurality of color measurement instruments:
            producing a first correction based on a comparison of a portion of the first set of spectral data that was taken by the given instrument to the second set of spectral data, wherein the first correction aligns the portion of the first set of spectral data that was taken by the given instrument with the second set of spectral data;
        mathematically correcting the first set of spectral data using the plurality of initial profiles, wherein the correcting results in a third set of spectral data;
        generating a plurality of new profiles for the plurality of color measurement instruments, using the third set of spectral data, wherein the generating the plurality of new profiles comprises:
            calculating a mean of the third set of spectral data; and
            producing, for each given instrument in the plurality of color measurement instruments, a second correction based on a comparison of the portion of the first set of spectral data that was taken by the given instrument to the mean, wherein the second correction aligns the portion of the first set of spectral data that was taken by the given instrument with the mean;
        obtaining a preliminary reflectance measurement of a sample taken by one of the plurality of color measurement instruments; and
        generating a corrected reflectance measurement using the preliminary reflectance measurement and the second correction corresponding to the one of the plurality of color measurement instruments.

\* \* \* \* \*